United States Patent
Roth

(10) Patent No.: US 11,232,343 B2
(45) Date of Patent: Jan. 25, 2022

(54) DUAL PASSIVE TECHNOLOGY RFID TEMPERATURE ACTIVATED MEDIA

(71) Applicant: AVERY DENNISON RETAIL INFORMATION SERVICES, LLC, Mentor, OH (US)

(72) Inventor: Mark W. Roth, North Miami, FL (US)

(73) Assignee: Avery Dennison Retail Information Services, LLC, Mentor, OH (US)

( * ) Notice: Subject to any disclaimer, the term of this patent is extended or adjusted under 35 U.S.C. 154(b) by 0 days.

(21) Appl. No.: 16/214,106

(22) Filed: Dec. 9, 2018

(65) Prior Publication Data
US 2019/0205724 A1  Jul. 4, 2019

Related U.S. Application Data

(60) Provisional application No. 62/611,700, filed on Dec. 29, 2017.

(51) Int. Cl.
*G06K 19/06* (2006.01)
*G06K 19/077* (2006.01)
(Continued)

(52) U.S. Cl.
CPC ........ *G06K 19/07777* (2013.01); *G01K 11/12* (2013.01); *G06K 19/0717* (2013.01);
(Continued)

(58) Field of Classification Search
CPC ........... G06K 19/0723; G06K 19/0717; G06K 7/0008; G06K 19/07749; G06K 19/0707; G06K 7/10366; G06K 19/0712
(Continued)

(56) References Cited

U.S. PATENT DOCUMENTS

| 4,892,677 A | 1/1990 | Preziosi et al. |
| 6,294,997 B1 * | 9/2001 | Paratore ............. G06K 19/0717 235/385 |

(Continued)

FOREIGN PATENT DOCUMENTS

| DE | 102009005100 | 7/2010 |
| JP | 2007089054 | 4/2007 |

(Continued)

OTHER PUBLICATIONS

International Search Report and Written Opinion of ISA/EP dated Apr. 16, 2019 prepared for PCT/US2018/64639.
(Continued)

*Primary Examiner* — Jamara A Franklin

(57) ABSTRACT

RFID devices are provided for use in combination with a food item or other temperature-sensitive item. The RFID devices include an RFID chip and an antenna electrically coupled to the RFID chip, along with a temperature-sensitive member. The temperature-sensitive member is configured to be in a first condition below a selected temperature and a second condition above the selected temperature to signify that the RFID device and associated food item or other temperature-sensitive item have been exposed to a temperature above the selected temperature. The temperature-sensitive member may be incorporated into the antenna to render the antenna at least partially inoperative above the selected temperature. The temperature-sensitive member may instead be configured to exhibit different colors below and above the selected temperature, or a single RFID device may include both types of temperature-sensitive members. Such RFID devices may also incorporate tamper-resistant features and/or accommodate human- and/or machine-readable printed symbols.

16 Claims, 4 Drawing Sheets

(51) Int. Cl.
*G06K 19/07* (2006.01)
*G01K 11/12* (2021.01)
*H01H 37/32* (2006.01)
*H01H 37/72* (2006.01)
*H01H 37/76* (2006.01)

(52) U.S. Cl.
CPC ... *G06K 19/0723* (2013.01); *G06K 19/07726* (2013.01); *H01H 37/323* (2013.01); *H01H 37/72* (2013.01); *H01H 37/76* (2013.01)

(58) Field of Classification Search
USPC ........ 235/492, 375; 340/10.1, 539.1, 539.26, 340/572.1
See application file for complete search history.

(56) References Cited

U.S. PATENT DOCUMENTS

| | | |
|---|---|---|
| 2005/0284358 A1 | 12/2005 | Laackmann |
| 2008/0272131 A1 | 11/2008 | Roberts et al. |
| 2010/0225482 A1* | 9/2010 | Kasai ..................... G08B 13/08 340/572.1 |
| 2013/0162402 A1* | 6/2013 | Amann .................. G06F 16/00 340/10.1 |
| 2014/0209692 A1 | 7/2014 | Ozaki |
| 2017/0255854 A1 | 9/2017 | Bhatia et al. |

FOREIGN PATENT DOCUMENTS

| | | |
|---|---|---|
| WO | 2001025472 | 4/2001 |
| WO | 2002073523 | 9/2002 |
| WO | 2002077939 | 10/2002 |
| WO | 2004042668 | 5/2004 |
| WO | 2006068999 | 6/2006 |
| WO | 2014197573 | 12/2014 |

OTHER PUBLICATIONS

Invitation to Pay Additional Fees dated Feb. 27, 2019 issued in corresponding IA No. PCT/US2018/064639 filed Dec. 9, 2018.
International Preliminary Report on Patentability dated Jun. 30, 2020 issued in corresponding IA No. PCT/US2018/064639 filed Dec. 9, 2018.

* cited by examiner

DUAL PASSIVE TECHNOLOGY RFID TEMPERATURE ACTIVATED MEDIA

CROSS REFERENCE TO RELATED APPLICATION(S)

The present application claims priority to and the benefit of United States provisional utility patent application No. 62/611,700 filed Dec. 29, 2017, which is incorporated herein by reference in its entirety.

BACKGROUND

Field of the Disclosure

The present subject matter relates to tracking and temperature monitoring of temperature-sensitive items. More particularly, the present subject matter relates to tracking and temperature monitoring using radio frequency identification ("RFID") technology.

Description of Related Art

Food manufactures typically have very tight environmental controls in place within their own facilities and packaging processes, as many food items must be stored and transported under particular conditions to ensure their freshness and quality. The guarantee of freshness and quality assurance of proper handling right up until the point of consumption or the point of retail sale is paramount. While manufacturers typically implement some level of quality oversight as part of their food production process, it is the subsequent storage, transit, menu integration, and/or retail display residing outside their direct influence that pose a greater risk the further away a food item moves from point of manufacture.

Due to potential liability and food safety concerns, the food industry is exploring ways to implement the use of RFID devices, such as passive ultra-high frequency ("UHF") devices, embedded in various media to track and trace product through the entire supply chain. Unfortunately, this only addresses one facet of identification, and quality handling itself (i.e., proper temperature control during transport, storage, and/or display) may be suspect. Indeed, it is critical to insure both food safety and lot tracking to provide quality and freshness assurance in food products.

While the foregoing is certainly true for many food items, it should be understood that lot tracking and exposure to temperature variations are also concerns for any other temperature-sensitive items, including non-food items, that may experience temperature fluctuations on their journey from the point of origin to the point of use or consumption.

SUMMARY

There are several aspects of the present subject matter which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as may be set forth in the claims appended hereto.

The present disclosure is directed to various approaches to combining the typical lot tracking functionality of an RFID device (e.g., as applied to a container, package or item such as, but not limited to, a food item, the package of a food item, or some other item requiring consistent refrigeration or the package of such an item) with a configuration capable of alerting a manufacturer, logistics handler, and/or a consumer to a temperature-sensitive item being exposed to a temperature above a certain level. In one embodiment, both the lot tracking and temperature monitoring aspects of the approaches described herein are referred to herein as "passive" to the extent that they require an external event (e.g., an increase in temperature or signal transmission in an RF field) to activate or trigger the technology. Thus, RFID devices described herein may be considered to employ "dual passive" technology.

One of the intentions of the present invention is to provide a means of indicating quality assurance and product safety, and in doing so, create a tamper-resistant label as well. These dual technologies are preferably provided in combination so that their individual functions cannot be easily defeated or subverted.

The dual technologies described herein may be incorporated into an RFID device in a variety of ways. Accordingly, different embodiments are described herein, with each being capable of creating a solution that combines visual indicia with the advantages of RFID technology to carry data internal to the RFID device itself. The various combinations may provide different levels of security and/or different levels of cost, which may be attractive to different segments of the markets that would utilize this technology.

According to one aspect of the present disclosure, an RFID device may further provide visual feedback (e.g., color change) to indicate exposure to an elevated temperature. In one embodiment, it is possible to have LED in the RFID circuit that may illuminate. The LED circuit, in this embodiment, can "piggy back" on the antenna used for the RFID. Additionally, RFID devices according to the present disclosure may utilize media conducive to printing methods, with human- and/or computer readable information (e.g., text or a bar code) being imparted on a portion of such an RFID device or another surface associated with the RFID device. By incorporating such technology, RFID devices according to the present disclosure may provide even more levels and types of communication regarding the disposition and status of an associated temperature-sensitive item.

Further aspects according to the present disclosure include a device incorporating an RFID device having an RFID chip, an antenna electrically coupled to the RFID chip, and a temperature-sensitive member, which optionally can be incorporated into the antenna. The temperature-sensitive member is configured to be in a first condition below (or above) a selected temperature and in a second condition above (or below) the selected temperature to signify that the RFID device has been exposed to a temperature above the selected temperature. Another aspect includes a method for modifying the media to alert a manufacturer, logistic handler, and/or consumer to the status of a desired or required condition of those items, for example items requiring maintenance at a temperature within a given range or above or below a given threshold temperature. In this and other aspects, included can be a print-conductive portion configured for printing upon with indicia.

Additional aspects include a device or method practiced by the device incorporating an RFID chip, an antenna electrically coupled to the RFID chip, and a temperature-sensitive member. The antenna includes a near-field sub-antenna electrically coupled to the RFID chip, with a wide-field sub-antenna electrically coupled to the near-field sub-antenna. The temperature-sensitive member is incorporated into the wide-field sub-antenna, electrically conductive below (or above) a selected temperature, and electrically non-conductive above (or below) the selected temperature, such that the wide-field sub-antenna is operative below (or above) the selected temperature when the temperature-sensitive member is electrically conductive and inoperative above (or below) the selected temperature when the temperature-sensitive member is electrically non-conductive.

Yet additional aspects include a device or method practiced by the device incorporating an RFID chip, an antenna electrically coupled to the RFID chip, and a temperature-sensitive member. The temperature-sensitive member comprises a temperature-sensitive catalyst positioned between two contact points of the antenna, with the temperature-sensitive catalyst being configured to be electrically conductive below (or above) a selected temperature to electrically couple the two contact points, but rendered electrically non-conductive above (or below) the selected temperature to render the antenna at least partially inoperative above (or below) the selected temperature.

Further aspects according to the present disclosure include a device incorporating an RFID chip, with an antenna electrically coupled to the RFID chip. A temperature-sensitive member of the device is configured to be in a first condition below a selected temperature and in a second condition above the selected temperature to signify that the RFID device has been exposed to a temperature above the selected temperature, as well as a method for modifying the media to alert a manufacturer, logistic handler, and/or consumer to the status of a desired or required condition of those items, for example items requiring maintenance at a temperature within a given range or above or below a given threshold temperature. The temperature-sensitive member comprises two contact points formed of a shape memory alloy, with the contact points being configured to be spaced apart above the selected temperature to render the antenna at least partially inoperative, and the contact points being configured to move into contact with each other below the selected temperature to render the antenna operative.

Additional aspects include a device or method practiced by the device incorporating an RFID chip, an antenna electrically coupled to the RFID chip, and a temperature-sensitive member. The temperature-sensitive member comprises two contact points formed of a shape memory alloy, with the contact points being configured to be spaced apart above (or below) a selected temperature to render the antenna at least partially inoperative, and the contact points being configured to move into contact with each other below (or above) the selected temperature to render the antenna operative.

Yet additional aspects include a device or method practiced by the device incorporating an RFID chip, an antenna electrically coupled to the RFID chip, and a temperature-sensitive member. The temperature-sensitive member is incorporated into the antenna, is electrically conductive below (or above) a selected temperature to render the antenna operative, is electrically non-conductive above (or below) the selected temperature to render the antenna at least partially inoperative, and is capable or incapable of reversibly alternating between the first and second conditions.

In addition, aspects include a device or method practiced by the device incorporate an RFID chip, an antenna electrically coupled to the RFID chip, and a temperature-sensitive member that is of a fuse-type incorporated into the antenna or an antenna component and configured to break above (or below) a selected temperature to render the antenna or antenna component inoperative.

Further aspects include a device or method practiced by the device incorporating an RFID chip, an antenna electrically coupled to the RFID chip, and a temperature-sensitive member that is configured to exhibit a first color below (or above) a selected temperature and a second, different color above (or below) the selected temperature. The temperature-sensitive member is optionally incapable of changing color once a color change is effected, and also optionally includes another different temperature for a label design to exhibit the capability of changing several color states. When desired, the temperature-sensitive member can include adjacent first and second layers, with the second layer being configured to catalyze a chemical change of the first layer to change from the first to the second color when the temperature increases (or decreases) with respect to a critical temperature.

Added aspects include a device or method practiced by the device incorporating an RFID chip, an antenna electrically coupled to the RFID chip, and a temperature-sensitive member, which includes at least one frangible member and an adhesive securing the device to a surface, with the frangible member or members being configured to break upon removal of the device from the surface, thereby preventing intact removal of the device from the surface.

DESCRIPTION OF THE ILLUSTRATED EMBODIMENTS

As required, detailed embodiments of the present invention are disclosed herein; however, it is to be understood that the disclosed embodiments are merely exemplary of the invention, which may be embodied in various forms. Therefore, specific details disclosed herein are not to be interpreted as limiting, but merely as a basis for the claims and as a representative basis for teaching one skilled in the art to variously employ the present invention in virtually any appropriate manner.

Figure 1:
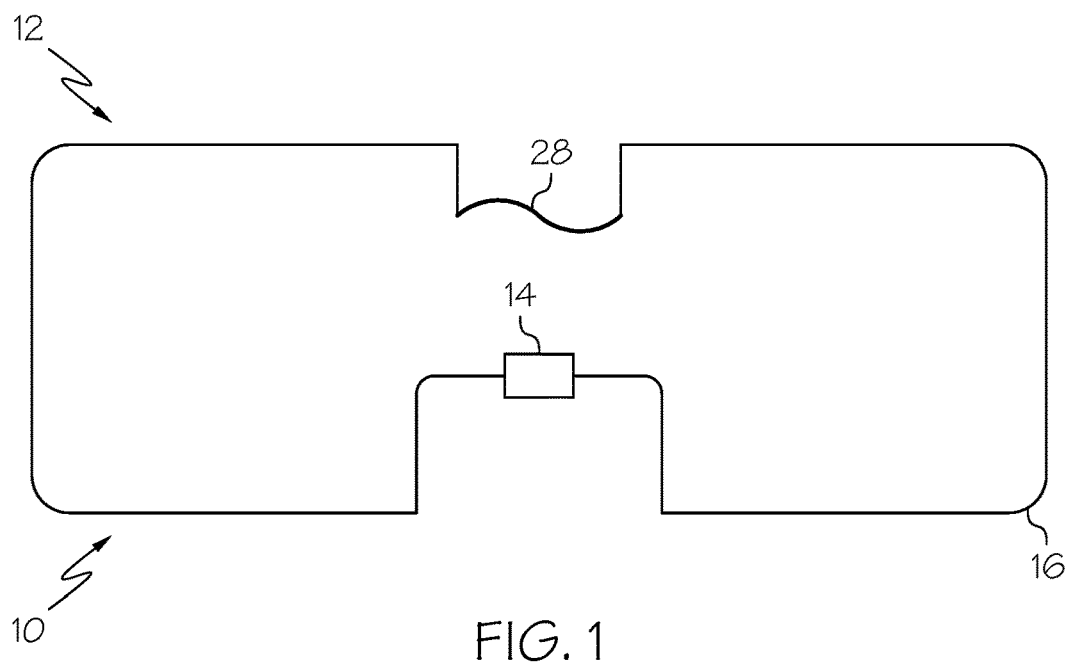
FIG. 1 is a top plan view of an embodiment of an RFID device configured according to an aspect of the present disclosure.

FIG. 1 illustrates an embodiment of an RFID device 10 according to an aspect of the present disclosure. The RFID device 10 includes an RFID inlay 12 with an RFID chip 14 and a t least one associated antenna 16 for transmitting information to and/or receiving information from an RFID reader (not illustrated), as generally known in the art such as, but not limited to an RFID enabled handheld or RFID fixed reader tied to at least one external antenna. The RFID chip 14 of the present invention may be directly attached to the at least one antenna 16 or a strap may be utilized in another embodiment. The present invention also contemplates the utilization of contact extensions or contact "bumps" for attachment purposes of the chip to the antenna. For example, in one embodiment, the RFID chip 14 includes an integrated circuit for controlling RF communication and other functions of the RFID device 10. Use of unique encoding of data within the RFID chip 14 provides a layer of tamper-proof technology, as the alpha-numeric sequence programmed into the RFID chip 14 may not be easily duplicated once it exits the control of the manufacturer that originated it.

As for the antenna 16, the illustrated embodiment is configured for wide-field RF communication to allow remote tracking of the item to which the RFID device 10 is secured. The present invention is not limited to wide-field RF communication. For a wide field range the reader is at a distance greater than near contact. In a near field antenna design the RFID reader may be touching or nearly touching in order to communicate with the chip of the inlay. The antenna configuration of FIG. 1 is merely exemplary, and other antenna configurations known in the art may also be employed without departing from the scope of the present disclosure, such as but not limited to, a dipole as will be described in greater detail herein. Any sort of antenna design set forth herein is for illustration purposes only and the present invention is not limited to any particular design.

Figure 2:
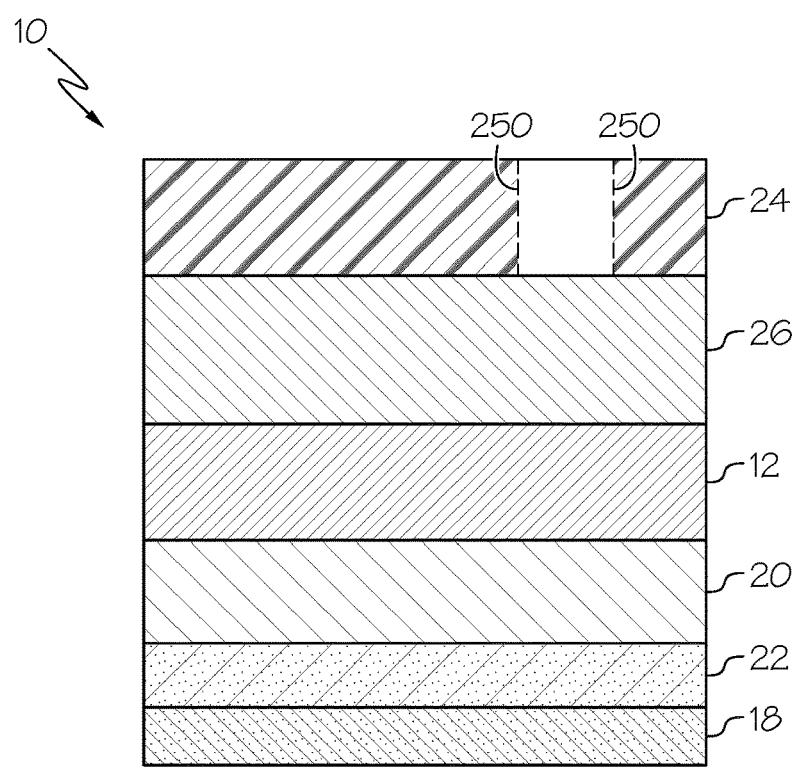
FIG. 2 is a cross-sectional somewhat schematic side view of the RFID device of FIG. 1, secured to a surface of a food item or other temperature-sensitive item

FIG. 2 is a cross-sectional view of the RFID device 10 of FIG. 1, secured to a surface 18 of an item. As shown in FIG. 2, the RFID device 10 includes a substrate 20; the present invention is not limited to any particular types of substrate (e.g., a paper, plastic, or fabric material) upon which the RFID inlay 12 is mounted. A layer of adhesive 22 is positioned on the opposite surface of the substrate 20 to fixedly secure the RFID device 10 to the surface 18 of the item. The layer of adhesive 22 may be curtain or pattern coated. In one embodiment presently contemplates, the layer of adhesive 22 is a freezer grade adhesive. RFID devices according to the present disclosure are typically secured or otherwise incorporated into the package of a food item, rather than being directly secured to the food item itself. However, an RFID device according to the present disclosure may also be directly secured to the food item itself. In the case of other temperature-sensitive items, RFID devices according to the present disclosure may be directly secured to the item itself or, alternatively, secured or otherwise incorporated into the package of the item. Thus, it should be understood that RFID devices according to the present disclosure are not limited to use with any particular items (e.g., food items) and are not limited to joinder to a particular item (or a package thereof) in any particular manner and/or in any particular location.

As used herein, the term "package" should be understood to refer broadly to either a package for an individual item or a package for a plurality of individual items, such as a carton or pallet. Indeed, the methodology described herein may be used at various packaging levels from pallet to carton or even applied to the item itself to provide the granularity necessary as determined by the manufacture and/or government entity or simply may be required to be in compliance with some regulation or quality guidelines.

The RFID device 10 may include one or more layers positioned above the RFID inlay layer 12, with FIG. 2 illustrating two layers 24 and 26. Such upper layers 24 and 26 may be variously configured without departing from the scope of the present disclosure. For example, as will be described in greater detail herein, one of the upper layers may be configured to display printed media, with another one of the upper layers being used to provide a temperature-monitoring function for ranges such as but not limited to 40° F. degrees refrig) and lower (freeze/deep freeze). Various layers are illustrated in FIG. 2 by cross-hatching, and the specific cross-hatching protocols used are not intended to be limiting as to the material, whether metallic, polymeric, cellulosic, or other materials. In one embodiment, these layers 24, 26 are adhered to one another via two separate layers of adhesive, and a layer of adhesive is applied to the top face of the RFID inlay layer 12.

Turning back now to the antenna 16, a temperature-sensitive fuse focused on in or out of spec temperature requirements or thermal cutoff 28 is incorporated therein. The fuse 28 may be configured to be in a first condition below a selected temperature and a second condition above the selected temperature. The particular temperature may vary, but is preferably the temperature below which the food item or other temperature-sensitive item associated with the RFID device 10 is to be maintained. Below the selected temperature, the fuse 28 is in an intact, electrically conductive condition, which allows for the antenna 16 to be operative. Above the selected temperature, the fuse 28 breaks, placing it into an electrically non-conductive condition and rendering the antenna 16 inoperative by opening the circuit defined by the antenna 16. By breaking above the selected temperature, the fuse 28 prevents the RFID device 10 from communicating with an RFID reader, resulting in an incomplete quantity count and effectively communicating that the food item or other temperature-sensitive item has been exposed to an elevated temperature, which may have compromised the freshness and/or quality of the item. Further, decreasing the temperature below the selected temperature does not restore functionality to the antenna 16, as the fuse 28 has irreversibly transitioned from a conductive condition to a non-conductive condition, which may be preferred to an approach that is capable only of signifying the current temperature of the item without regard to previous temperature cycling.

Causing the fuse 28 to break above the selected temperature may be achieved, for example, by selecting a material having a suitable coefficient of thermal expansion, with the preferred material varying based on the selected temperature. The preferred material may also depend upon the nature of the substrate 20, as the coefficient of thermal expansion of the substrate 20 and its tendency to expand or contract upon an increase in temperature may affect the temperature at which the fuse 28 breaks. The substrate, which is illustrated as being metallic in FIG. 2, can be of any material having the desired thermal expansion properties, including non-metallic materials. Other approaches to causing the fuse 28 to break above the selected temperature may also be employed without departing from the scope of the present disclosure such as, but not limited to bending and/or folding the fuse.

Figure 3:
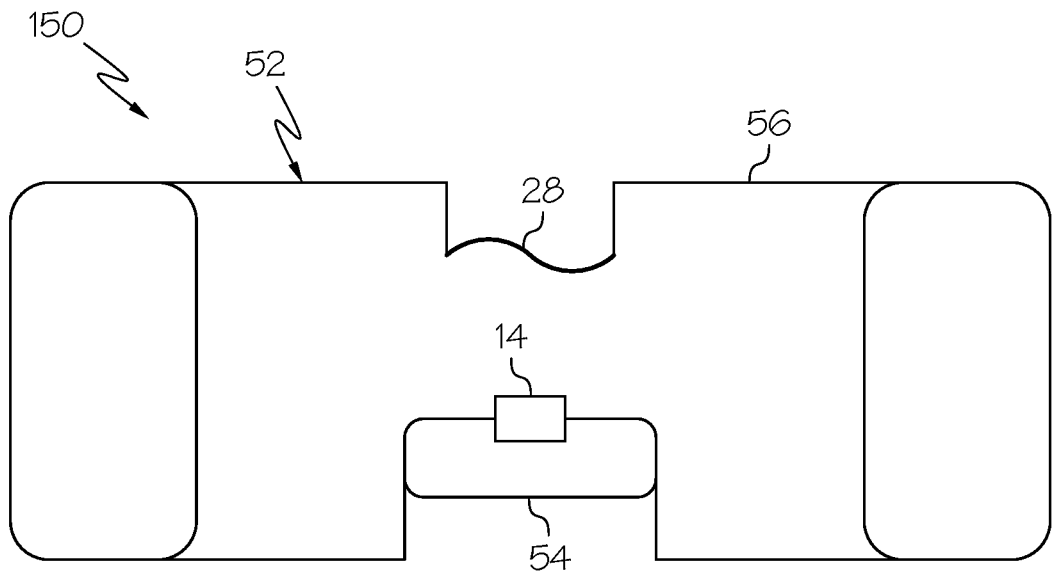
FIG. 3 is a top plan view of another embodiment of an RFID device according to aspects of the present disclosure.

FIG. 3 illustrates a variation of the RFID device 10 of FIG. 1. In the RFID device 50 of FIG. 3, the RFID chip 14 and fuse 28 are configured as in FIG. 1, with a differently configured antenna 52. The antenna 52 of FIG. 3 is a combination of a near-field sub-antenna 54 electrically coupled to the RFID chip 14, with a wide-field sub-antenna 56 electrically coupled to the near-field sub-antenna 54. The fuse 28 is incorporated into the wide-field sub-antenna 56 and configured such that a broken fuse will only render the wide-field sub-antenna 56 inoperative, while the near-field sub-antenna 54 remains operative both below and above the selected temperature. Thus, breaking the fuse 28 renders the antenna 52 only partially inoperative, rather than completely inoperative, as in the embodiment of FIG. 1. This may be advantageous if it is preferred for the RFID device 50 to retain some functionality after exposure to an elevated temperature, such as being able to communicate with a nearby or local RF reader while becoming non-communicative with a distant or far-field RF reader.

Figure 4:
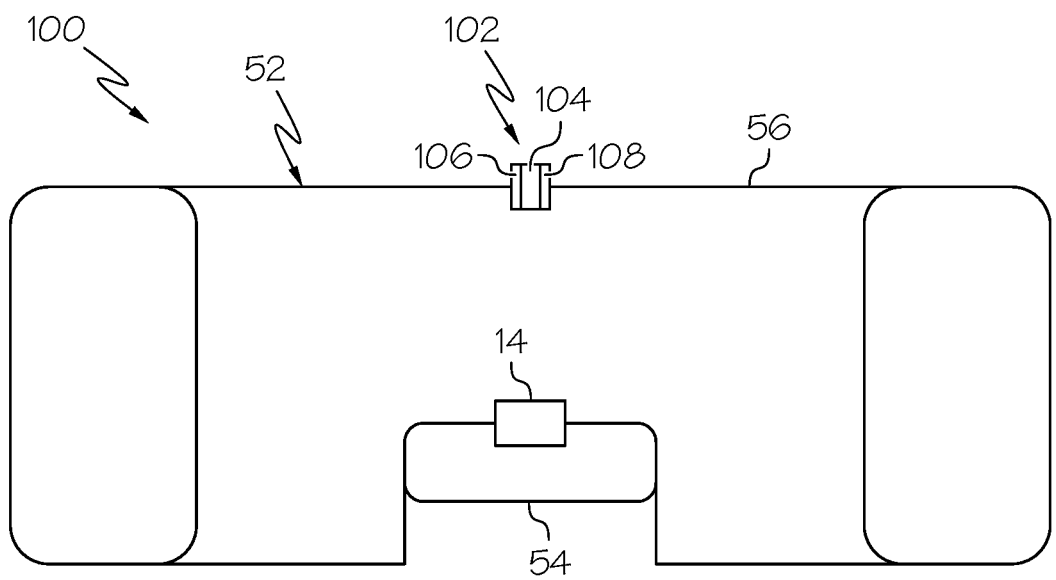
FIG. 4 is a top plan view of yet another embodiment of an RFID device according to aspects of the present disclosure.

FIG. 4 illustrates a variation of the RFID device 50 of FIG. 3. In the RFID device 100 of FIG. 4, the RFID chip 14 and the antenna 52 are as configured in FIG. 3, with a member 102 such as a temperature-sensitive member replacing the fuse 28. While FIG. 4 illustrates a composite antenna 52 of the type shown in FIG. 3, it should be understood that the member 102 may be incorporated into a differently configured antenna, such as the antenna 16 of FIG. 1.

The member 102 of FIG. 4 comprises a catalyst 104, such as but not limited to, a temperature sensitive catalyst positioned between two contact points 106 and 108 of the wide-field sub-antenna 56. The catalyst 104 is configured to be electrically conductive below the selected temperature to electrically couple the contact points 106 and 108 (rendering the wide-field sub-antenna 56 operative), while being electrically non-conductive (e.g., by breaking) above the selected temperature to decouple the contact points 106 and 108 (rendering the wide-field sub-antenna 56 inoperative).

The RFID device 100 may be manufactured above the selected temperature (e.g., at room temperature), with the catalyst 104 activating when the temperature decreases below the selected temperature. This is in contrast to the fuse 28 of FIGS. 1 and 3, as the RFID device 10, 50 into which the fuse 28 is incorporated must be manufactured below the selected temperature to ensure that the fuse 28 remains intact.

Figure 5:
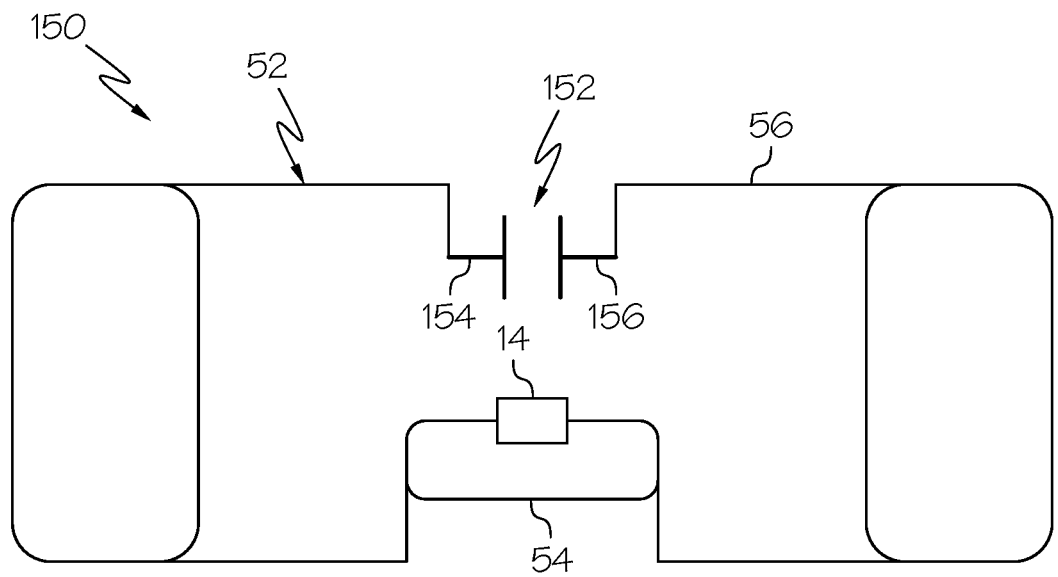
FIG. 5 is a top plan view of another embodiment of an RFID device according to aspects of the present disclosure, with a temperature-sensitive member of the RFID device in an electrically non-conductive condition.
Figure 6:
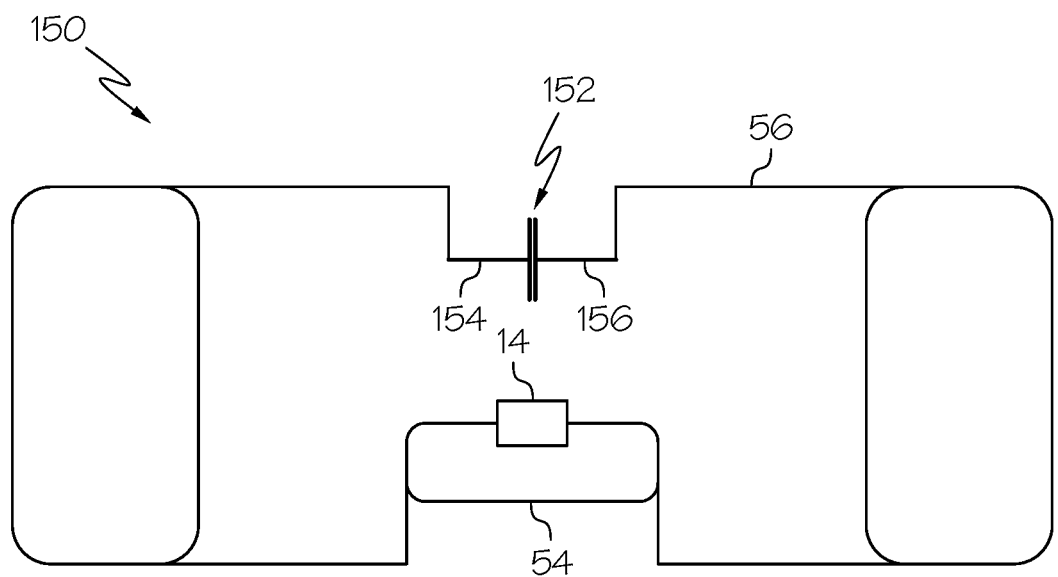
FIG. 6 is a top plan view of the RFID device of FIG. 5, with the temperature-sensitive member in an electrically conductive condition.

FIGS. 5 and 6 illustrate yet another embodiment of an RFID device 150 having a temperature-sensitive member 152 incorporated into its antenna 52. FIGS. 5 and 6 illustrate a composite antenna 52 as in FIGS. 3 and 4, but it should be understood that the temperature-sensitive member 152 may be incorporated into a differently configured antenna, such as the antenna 16 of FIG. 1.

In the embodiment of FIGS. 5 and 6, the temperature-sensitive member 152 comprises two contact points 154 and 156 formed of a shape memory alloy. Above the selected temperature, the two contact points 154 and 156 are spaced apart (as shown in FIG. 5), with the two contact points 154 and 156 being in contact with each other below the selected temperature (as shown in FIG. 6). With the contact points 154 and 156 spaced apart, the temperature-sensitive member 152 becomes electrically non-conductive, rendering the wide-field sub-antenna 56 inoperative above the selected temperature. With the contact points 154 and 156 in contact with each other, the temperature-sensitive member 152 become electrically conductive, rendering the wide-field sub-antenna 56 operative below the selected temperature.

In one embodiment, the contact points 154 and 156 are in their initial form above the selected temperature (as in FIG. 5), deform to contact each other upon a decrease in temperature (as in FIG. 6), before returning to their initial form when the temperature again rises. In another embodiment, the contact points 154 and 156 are in their initial form below the selected temperature (as in FIG. 6), deform to be spaced apart upon an increase in temperature (as in FIG. 5), before returning to their initial form when the temperature again decreases.

In contrast to the other embodiments described herein, the temperature-sensitive member 152 of FIGS. 5 and 6 is free to move between its two conditions, rather than irreversibly changing from a low-temperature state to a high-temperature state. This may be advantageous to the extent that it provides more detailed information regarding the temperature cycling experienced by the RFID device 150 and associated temperature-sensitive item than the other embodiments. For example, the RFID device 150 of FIGS. 5 and 6 may communicate the number of times that it has been exposed to elevated temperatures and for how long each time, whereas the other RFID devices described herein are capable of only signifying exposure to an elevated temperature, without additional information. The embodiment preferred by a manufacturer may depend upon a number of factors, such as the cost of a particular RFID device and the detail of temperature-related information required.

While the foregoing embodiments employ an approach whereby the antenna of an RFID device is only fully functional below the selected temperature, it is also within the scope of the present disclosure for the antenna to instead be fully functional only above the selected temperature. In this case, at an elevated temperature, the antenna (or a wide-field sub-antenna thereof) would communicate to an RFID reader that the RFID device and associated temperature-sensitive item have been exposed to the elevated temperature. However, for lot-tracking purposes, it may be preferred for the antenna to be fully functional below the selected temperature and at least partially inoperative above the selected temperature.

Instead of (or in addition to) a temperature-sensitive member capable of at least partially incapacitating the antenna of an RFID device, an RFID device according to the present disclosure may include a temperature-sensitive member configured to change appearance to signify exposure to an elevated temperature. For example, the temperature-sensitive member may be a portion of the RFID device that is a first color (e.g., blue) below the selected temperature and a second color (e.g., white) above the selected temperature, so that it can be seen whether the RFID device and the item associated with it are below or above the selected temperature. The color change may be reversible (i.e., allowing the temperature-sensitive member to freely alternate between the two colors) to indicate the current temperature of the RFID device and associated item. In another embodiment, the temperature-sensitive member is not capable of returning to the first color once it has exhibited the second color, thereby signifying that the RFID device and associated item have been exposed to an elevated temperature, even if they are currently exposed to a temperature below the selected temperature.

This may be achieved, for example, by providing the RFID device with a thermo-chemically reactive layer, which may preferably be an upper or top layer of the RFID device for improved visibility. In one embodiment, a top print-conducive portion or layer 24 of an RFID device 10 (FIG. 2) may be a coated thermally reactive media, similar to those used in pressure-sensitive media for thermal direct uses, or may be a non-coated media allowing use of ink jet or thermal transfer printing techniques (e.g., if it would be advantageous to apply human-readable symbols, such as letters and numbers, and/or computer-readable symbols, such as a barcode, to the RFID device 10). The layer 26 below the top layer 24 may be a color-activation layer, which may be positioned directly above the RFID inlay 12.

According to one approach, a chemical catalyst activates and reacts with the media's adjacent layers when the temperature is brought below the selected temperature, causing the color-activation layer 26 to exhibit its first color (e.g., blue). This allows the color-activation layer 26 to exhibit its first color only if the temperature is maintained below the selected temperature. Once the temperature has increased above the selected temperature, the color-activation layer 26 will change to its second color (e.g., white) and remain in that alert color for the remainder of its lifetime. By such a configuration, an observer can tell if the food item or other temperature-sensitive item has been allowed to exceed the proper storage temperature and, as necessary, take appropriate actions to prevent the item from being made available for purchase or use. Another color or colors can be included; for example, a color other than blue and white of the example can be used. In essence, the label design can be able to carry the capability to change several color states.

Figure 7:
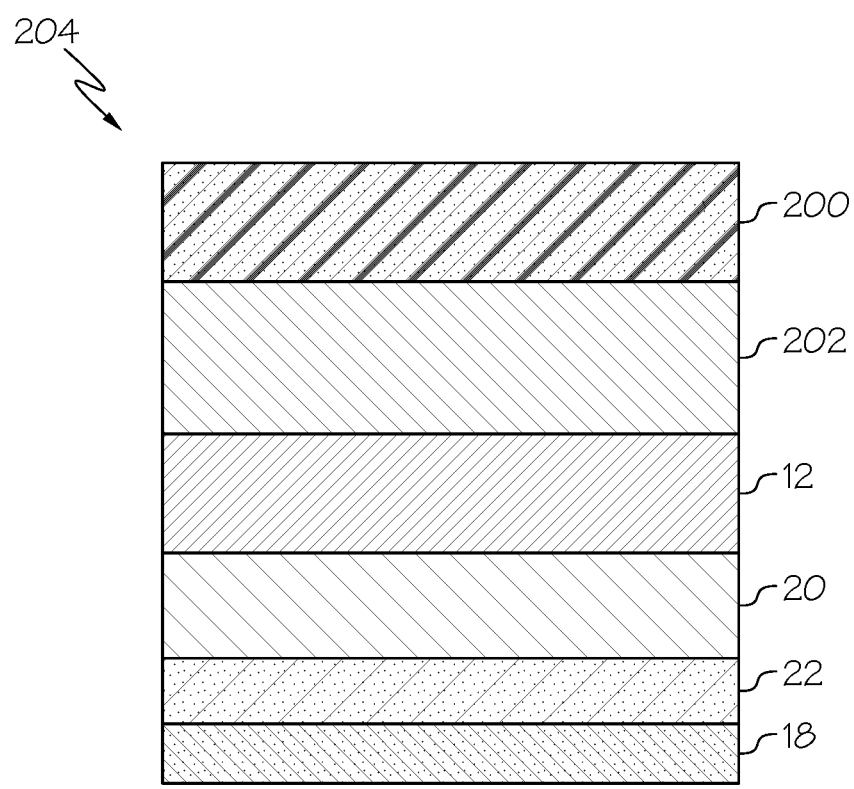
FIG. 7 is a cross-sectional somewhat schematic side view of another embodiment of an RFID device according to aspects of the present disclosure.

In cases where printable characters or barcodes need not be present, an alternative approach may be to employ a translucent top layer 200 combined with a catalyzing adjacent layer 202 (FIG. 7). Once the catalyst fires off as a reaction to exposure to a temperature below the selected temperature, a chemical change occurs to the translucent layer 200, altering its color. When the RFID device 204 is exposed to a temperature above the selected temperature, it will permanently change to its second color. Various layers are illustrated in FIG. 7 by cross-hatching, and the specific cross-hatching protocols used are not intended to be limiting as to the material, whether metallic, polymeric, cellulosic, or other materials.

Other technology may also be incorporated into RFID devices according to the present disclosure. For instance, an RFID device of the type described herein may employ at least one frangible member that is configured to break upon removal of the RFID device from an associated item. In one exemplary embodiment, a top layer 24 of the RFID device 10 may be provided with what are commonly referred to as "security slits" 250 (FIG. 2). If an attempt is made to remove the RFID device 10 from an associated item 18, the adhesive 22 holds the RFID device 10 to the item 18, while the frangible members 250 break, causing the RFID device 10 to come apart in small pieces, rather than being removed intact. The combination of the residue of the RFID device 10 and the potential for the adhesive 22 to mar the item 18 make it clear to an observer that the RFID device 10 has been tampered with.

It will be understood that the embodiments described above are illustrative of some of the applications of the principles of the present subject matter. Numerous modifications may be made by those skilled in the art without departing from the spirit and scope of the claimed subject matter, including those combinations of features that are individually disclosed or claimed herein. For these reasons, the scope hereof is not limited to the above description but is as set forth in the following claims, and it is understood that claims may be directed to the features hereof, including as combinations of features that are individually disclosed or claimed herein.

The invention claimed is:

1. An RFID device comprising:
   an RFID chip;
   an antenna coupled to the RFID chip, the antenna including at least a near-field sub-antenna electrically coupled to the RFID chip;
   a member configured to be in a first condition and in a second condition to signify that the RFID device has been exposed to an event, wherein the member is temperature sensitive and the first condition is below a selected temperature and the second condition is above a selected temperature;
   a wide-field sub-antenna electrically coupled to the near-field sub-antenna, and
   the temperature-sensitive member is incorporated into the wide-field sub-antenna, electrically conductive below the selected temperature, and electrically non-conductive above the selected temperature, such that the wide-field sub-antenna is operative below the selected temperature when the temperature-sensitive member is electrically conductive and inoperative above the selected temperature when the temperature-sensitive member is electrically non-conductive.

2. The RFID device of claim 1, wherein the near-field sub-antenna is operative below the selected temperature and above the selected temperature.

3. The RFID device of claim 1, wherein
   the temperature-sensitive member comprises a temperature-sensitive catalyst positioned between two contact points of the antenna,
   the temperature-sensitive catalyst is configured to be electrically conductive below the selected temperature to electrically couple the two contact points, and
   the temperature-sensitive catalyst is configured to be rendered electrically non-conductive above the selected temperature to render the antenna at least partially inoperative above the selected temperature.

4. The RFID device of claim 3, wherein the temperature-sensitive catalyst is configured to irreversibly break above the selected temperature.

5. The RFID device of claim 1, wherein
   the temperature-sensitive member comprises two contact points formed of a shape memory alloy,
   the contact points are configured to be spaced apart above the selected temperature to render the antenna at least partially inoperative, and
   the contact points are configured to move into contact with each other below the selected temperature to render the antenna operative.

6. The RFID device of claim 1, wherein the temperature-sensitive member is incorporated into the antenna,
   electrically conductive below the selected temperature to render the antenna operative,
   electrically non-conductive above the selected temperature to render the antenna at least partially inoperative, and
   capable of reversibly alternating between the first and second conditions.

7. The RFID device of claim 1, wherein
   the temperature-sensitive member comprises two contact points formed of a shape memory alloy,
   the contact points are configured to be in contact with each other below the selected temperature to render the antenna operative, and
   the contact points are configured to move away from each other above the selected temperature to render the antenna at least partially inoperative.

8. The RFID device of claim 1, wherein the temperature-sensitive member comprises a fuse incorporated into the antenna and configured to break above the selected temperature to render the antenna at least partially inoperative.

9. The RFID device of claim 1, wherein the temperature-sensitive member is configured to exhibit a first color below the selected temperature and a second color above the selected temperature.

10. The RFID device of claim 9, wherein the temperature-sensitive member comprises a thermo-chemically reactive top coat layer of the RFID device.

11. The RFID device of claim 9, wherein
the temperature-sensitive member includes adjacent first and second layers, and
the second layer is configured to catalyze a chemical change of the first layer so as to cause at least a portion of the first layer to change from the first color to the second color when a temperature of the temperature-sensitive member increases from below the critical temperature to above the critical temperature.

12. The RFID device of claim 1, further comprising a print-conducive portion configured to be printed upon with human or computer-readable symbols.

13. The RFID device of claim 1, further comprising
at least one frangible member, and
a freezer grade adhesive configured to secure the RFID device to a surface, wherein the at least one frangible member is configured to break upon removal of the RFID device from the surface to prevent intact removal of the RFID device from the surface.

14. An RFID device comprising:
an RFID chip;
an antenna electrically coupled to the RFID chip; and
a temperature-sensitive member incorporated into the antenna and configured to be electrically conductive below a selected temperature to render the antenna operative and electrically non-conductive above the selected temperature to render the antenna at least partially inoperative, wherein
the antenna comprises a near-field sub-antenna electrically coupled to the RFID chip, and a wide-field sub-antenna electrically coupled to the near-field sub-antenna, and the temperature-sensitive member is incorporated into the wide-field sub-antenna, electrically conductive below the selected temperature, and electrically non-conductive above the selected temperature, such that the wide-field sub-antenna is operative below the selected temperature when the temperature-sensitive member is electrically conductive and inoperative above the selected temperature when the temperature-sensitive member is electrically non-conductive.

15. The RFID device of claim 14, wherein the near-field sub-antenna is operative below the selected temperature and above the selected temperature.

16. The RFID device of claim 14, further comprising a portion configured to exhibit a first color below the selected temperature and a second color above the selected temperature.

* * * * *